United States Patent [19]

Ito et al.

[11] 3,909,835
[45] Sept. 30, 1975

[54] DEVICE FOR CONTINUOUSLY DRIVING A CAMERA

[75] Inventors: Tadashi Ito, Yokohama; Fumio Ito, Kawasaki, both of Japan

[73] Assignee: Canon Kabushiki Kaisha, Tokyo, Japan

[22] Filed: June 14, 1973

[21] Appl. No.: 369,785

[30] Foreign Application Priority Data

June 28, 1972 Japan............................ 47-65328

[52] U.S. Cl. .............................................. 354/204
[51] Int. Cl. ........................................... G03b 19/04
[58] Field of Search ..... 95/31 EL, 57, 31 AC, 53 E; 242/71.4, 71.5; 352/121; 354/204

[56] References Cited
UNITED STATES PATENTS

| | | |
|---|---|---|
| 2,596,222 | 5/1952 | Doyle et al. .................... 95/31 EL |
| 2,772,941 | 12/1956 | Hulcher ........................... 95/31 EL |
| 3,135,182 | 6/1964 | Hintze et al. ................. 354/204 X |
| 3,641,898 | 2/1972 | Kawahara ....................... 95/31 EL |
| 3,656,420 | 4/1972 | Aizawa et al. ..................... 354/173 |
| 3,705,338 | 12/1972 | Tsujimoto et al. ............ 354/204 X |
| 3,754,455 | 8/1973 | Tsujimoto et al. ................ 354/173 |

*Primary Examiner*—John M. Horan
*Attorney, Agent, or Firm*—William R. Woodward

[57] ABSTRACT

In a device for continuously driving a camera wherein a charge mechanism for film advance and shutter charge may be intermittently driven through a clutch mechanism and a shutter release mechanism may be driven from an electric motor during the inoperative period of the charge mechanism to thereby effect a sequence of shots during the revolutions of the motor, an adjustable constant voltage circuit is provided for energizing the electric motor so that the interval between successive shots of the camera may be adjusted by adjusting the voltage of the circuit.

9 Claims, 3 Drawing Figures

DEVICE FOR CONTINUOUSLY DRIVING A CAMERA

BACKGROUND OF THE INVENTION

1. Field of the Invention

This invention relates to a device for continuously driving a camera, and more particularly to such a device which has an electric motor as drive source and in which during revolutions of the motor, a charge mechanism capable of setting operations such as shutter charge, film advance, etc. is intermittently driven for constant angular movement through the agency of a clutch mechanism, whereafter a shutter release operation is effected.

2. Description of the Prior Art

In continuously taking pictures by the use of a camera equipped with a device of the described type, it is known to provide such device with a timer means for adjusting the interval between shots (i.e. the number of frames per second), whereas this has made the mechanism complicated and accordingly rendered the device larger in size.

Further, if the shutter release takes place immediately after the setting operations such as shutter charge, film advance, etc. have been completed, lower definition of formed images and inaccurate exposure time would occur to provide inferior quality of pictures because the film surface and/or the shutter mechanism might still be vibrating and unstable in position.

SUMMARY OF THE INVENTION

The present invention is directed to improvements over the above-noted disadvantages, and has for its object to provide a device for continuously driving a camera which enables the driving speed (the number of frames per second) to be adjusted as desired by a simple construction without increasing the size of the camera and which can produce pictures of good quality even during high-speed driving.

To achieve such an object, the device of the present invention is designed such that an electric motor is energized through an adjustable constant voltage circuit so as to enable the interval between shots to be adjusted by adjusting the number of revolutions of the motor and that shutter release operating means is provided forwardly of a clutch mechanism in the drive system, i.e. at a location adjacent the drive source so as to permit occurrence of shutter release with a sufficient time lag after completion of charge operation.

In the device of such type, it is necessary to provide a control so that all mechanisms may be stopped at their predetermined positions when the drive has been discontinued.

Especially, in the above-described arrangement wherein the charge mechanism and the release mechanism are separately disposed forwardly and rearwardly of the clutch mechanism, the stop positions of the respective mechanisms tend to be irregular due to their inertia differences and any phase difference among them might cause accidents in picture-taking operation and sometimes would lead to impossibility of operation. To avoid this, the present invention is constructed such that even after an operating switch for the motor circuit has been opened, the motor circuit is maintained in closed condition until a predetermined stop position is reached, whereupon the motor is electrically disconnected in such position. In this case, there is provided a switch circuit for short-circuiting the motor itself to brake the same and a stop mechanism for forcibly stopping the charge mechanism.

Phase differences similar to those described above may also occur in such a case where, in the stopped position of the device, the sprocket wheel of the charge mechanism is forcibly moved manually when the back cover of the camera has been opened for the purpose of film replacement or the like. According to the present invention, the sprocket wheel is designed such that it is disconnected from the charge mechanism in response to opening of the back cover and can freely rotate to thereby prevent the described accidents.

The invention will become more fully apparent from the following detailed description of an embodiment thereof taken in conjunction with the accompanying drawings.

DESCRIPTION OF THE PREFERRED EMBODIMENTS

The invention will be described with respect to an embodiment thereof as applied to a single lens reflex camera having a focal plane shutter.

Figure 1:
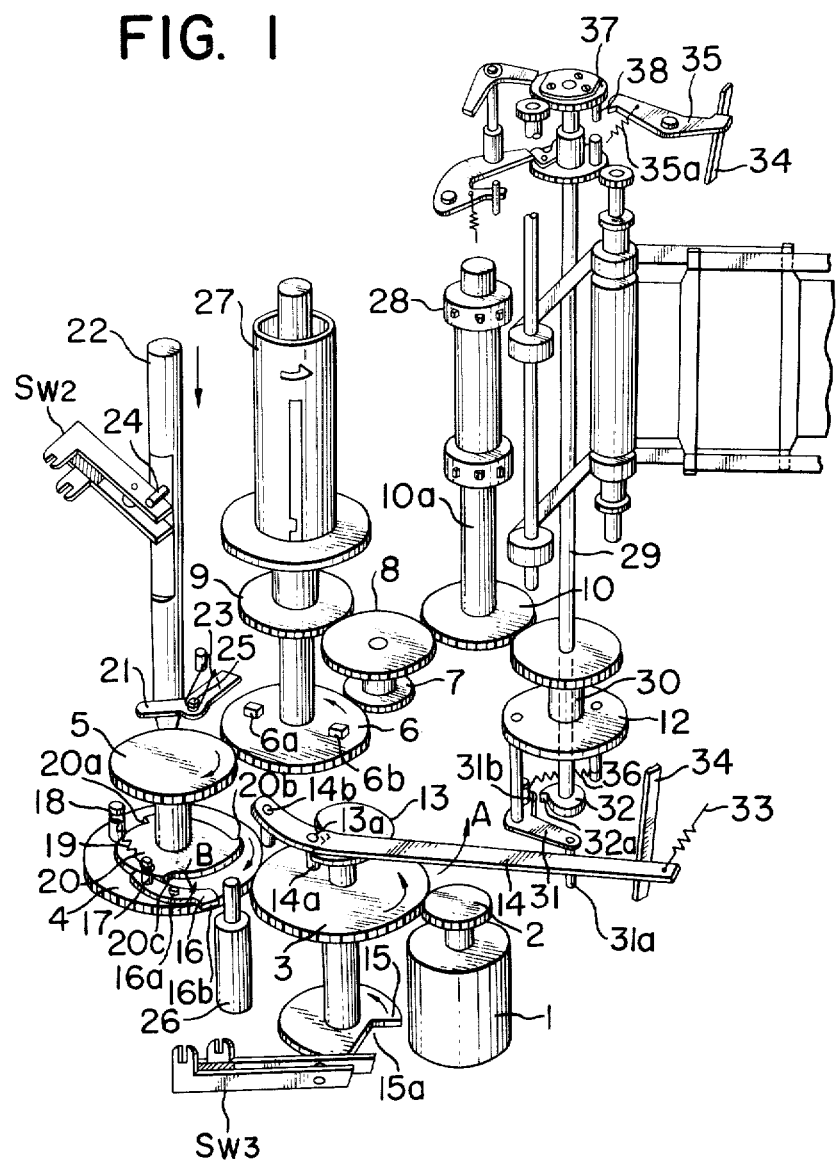
FIG. 1 is a perspective view of the device according to an embodiment of the present invention.

Referring to FIG. 1, the device of the present invention is shown in a position immediately after shutter release has taken place. As shown there, the shaft of an electric motor 1 which is a drive source has a gear 2 in meshing engagement with a gear 3. The gear 3 is also in meshing engagement with a gear 4 on which a clutch pawl 16 is supported for rotation about a pin 16a.

The clutch pawl 16 is biased by a spring 19 into engagement with a ratchet wheel 20 which is coaxial with and rotatable independently of the gear 4. The spring 19 has its opposite ends secured to pins 17 and 18 studded in the pawl 16 and gear 4, respectively. A gear 5, coaxial with the gear 4 and rotatable with the ratchet wheel 20, is connected via a gear train 6, 7, 8 to a spool gear 9 and to a sprocket gear 10 to drive a spool 27 and a sprocket 28, respectively, and is also adapted to charge a known focal plane shutter by means of a gear 11 freely fitted on a main shutter shaft 29 and meshing with the gear 10, a disc 12 integrally connected to the gear 11 by a sleeve 30 and freely fitted on the main shaft 29, a charge pawl 31 pivotally supported on the disc 12, and an engaging plate 32 secured to the lower end of the main shaft 29, as viewed in FIG. 1.

The gear 3 is integrally connected to two cams 13 and 15 and rotatably journalled to a camera body. A lever 14 is pivotally supported on the camera body by means of a pivot 14b and normally biased by a spring 33 to urge a pin 14a thereon into engagement with the camming surface of the cam 13. When the pin 14a is fully received in a cut-away portion 13a of the cam, the end portion of the lever 14 adjacent the spring 33 may actuate a pin 31a on the charge pawl 31 and accordingly a shutter release lever 34 to thereby disengage the pawl 31 from the engaging plate 32 and thereafter release a forward shutter curtain tightening hook 35, thus releasing the shutter.

On the other hand, the cam 15 is normally in engagement with a self-lock switch SW3 to maintain the switch normally in closed position. The switch SW3 may be opened when received in a cut-away portion 15a of the cam 15.

In the shown embodiment, the ratchet wheel 20 has three teeth. As the motor rotates, the tip end of the pawl 16 on the gear 4 may engage one of the teeth which is then at a position 20a, to thereby actuate the ratchet wheel 20 to rotate the gear 5 which will in turn drive a charge mechanism through the gear train as described above, thus accomplishing the setting operations such as shutter charge, film transport, etc. When the ratchet wheel 20 has rotated through a predetermined angle (in the shown embodiment, 240°) to shift from the position 20a to the position 20c in FIG. 1, the tail end 16b of the pawl 16 may strike a fixed pin 26 so that the pawl may be rotated in a direction of arrow B and out of engagement with the ratchet wheel 20.

The gear 6 has projections 6a and 6b formed thereon, and a stop lever 21 engageable with these projections is supported on the camera body for pivotal movement about a pivot 25 and normally biased by a spring 23 into engagement with the projection 6a and 6b.

One arm of the stop lever 21 is engaged with a cone-shaped end portion (lower end in FIG. 1) of a shutter release bar 22 and may be disengaged from the projection 6a or 6b upon depression of the release bar 22 in the direction of arrow. The release bar 22 has a pin 24 studded therein which is adapted to close a switch SW2 in a motor circuit when the release bar is depressed in the direction of arrow.

Figure 2:
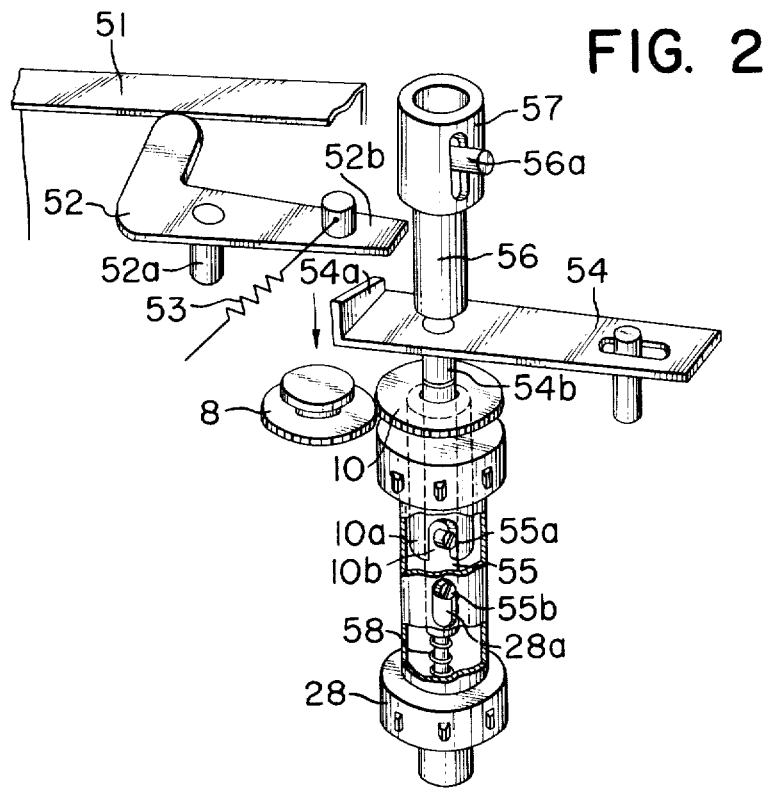
FIG. 2 is a detailed perspective view of the sprocket wheel shown in FIG. 1.

FIG. 2 particularly shows the construction of the sprocket wheel in FIG. 1 and is a view taken in the opposite direction to FIG. 1 for convenience of illustration. As shown, a cylinder 10a integral with the sprocket gear 10 is rotatably journalled within the inner periphery of the sprocket wheel 28, and a vertically slidable shaft 55 extends through the cylinder 10a and the sprocket wheel 28 and has studded pins 55a and 55b. The pin 55a is received in a cut-out groove 10b formed in the cylinder 10a, and the pin 55b is received in a slot 28a formed through the cylinder portion of the sprocket wheel 28. The shaft 55 is normally biased upwardly by a spring 58 into the position as shown in FIG. 2. In this position, the drive of the motor may be transmitted to the sprocket wheel 28 via gears 8, 10, cylinder 10a, pin 55a, shaft 55 and pin 55b. A cam plate 54 having a pin 54b studded therein and aligned with the shaft 55 is vertically movably mounted on the shaft, and a lever 52 having an arm 52b engageable with the camming surface 54a of the cam plate 54 is mounted for rotation about a pivot 52a. The lever 52 is normally biased into the shown retained position by a spring 53 with one end thereof being engaged with the back cover 51 of the camera. When the back cover 51 is opened, the lever 52 will be pulled for rotation by the spring 53 so that the arm 52b thereof will engage the camming surface 54a to urge the cam plate 54 downwardly in the direction of arrow. The shaft will accordingly be urged downwardly by the pin 54b of the cam plate against the force of the spring 58 to thereby bring the pin 55a out of the cut-out groove 10b in the cylinder 10a. If the sprocket wheel 28 is then actuated manually, it and the shaft 55 may be freely rotated but without affecting the gear train in any way because the cylinder 10a and the pin 55a are now out of engagement with each other.

Figure 3:
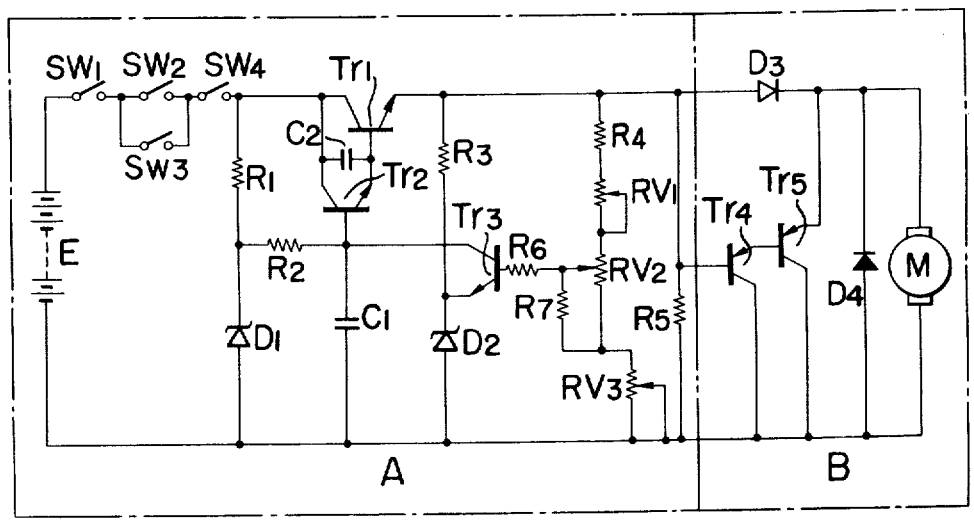
FIG. 3 is a diagram of the control circuit.

FIG. 3 shows a control circuit, which includes a power source E, main switch SW1, release switch SW2, selflock switch SW3 and self-stop switch SW4. A circuit portion A encircled by a dash-and-dot line is a conventional voltage circuit, and a portion B is a brake portion.

In this circuit, the main switch SW1 serves to connect and disconnect the power source, the self-stop switch SW4 is operatively associated with a film frame counter or like means to deenergize the motor when a predetermined number of frames has been exposed, the switch SW2 is operatively associated with the shutter release bar to be opened and closed thereby, and the switch SW3 serves to continue the revolution of the motor until the device assumes a predetermined stop position (i.e. the position in which shutter charge has been completed) after the switch SW3 has been opened.

The constant voltage circuit includes transistors Tr1, Tr2, Tr3, Zener diode D2, resistors R1, R2, R4, R5, R6, and variable resistor RV2, whose resistance value is variable to vary the voltage supplied to the motor so as to set the interval between shots (i.e. the number of frames per second). Zener diode D1, resistor R3 and capacitor C1 serve to maintain the emitter potential of transistor Tr3 at a predetermined level and thereby enhance the accuracy of the constant voltage. RV1 and RV3 are variable resistors for regulating the upper and lower limits of the constant voltage. C2 is a capacitor for preventing oscillation.

When the circuit is closed to supply power to the motor, the base-emitter voltage of transistors Tr4 and Tr5 in the brake circuit is applied in a reverse direction by the action of diode D3 so that these transistors Tr4 and Tr5 are in OFF condition. When the circuit is opened to cut off the power supply to the motor, the inertial revolution of the motor produces a counter electromotive force which applies a forward potential between the base and emitter of the transistors Tr4 and Tr5, so that these transistors turn on to short-circuit the motor, thus braking the motor. The transistors are connected together in Darlington's fashion to increase their effect, but alternatively a single transistor may be employed.

Operation of the above-described device will now be discussed. When an unshown camera shutter release button is depressed to lower the release bar 22 in the direction of arrow in FIG. 1 with the main switch SW1 and self-stop switch SW4 maintained in closed position, the lever 21 in engagement with the lower end of the release bar 22 is rotated clockwise against the force of the spring 23, as viewed in FIG. 1, so that the lever 21 is disengaged from the projection 6a or 6b on the gear 6, and then the release switch SW2 is closed. As the motor 1 revolves upon closing of the release switch SW2, the pawl 16 on the gear 4 engages one of the teeth of the ratchet wheel 20 which is then positioned at 20a, to thereby drive the gear 11 for clockwise rotation via the above-described gear train, whereupon the end of the charge pawl 31 biased by the spring 36 is engaged with the projection 32a to rotate the main shaft 29 and the disc 12 together. When the main shaft 29 has rotated through a predetermined angle as required for shutter charge, a projection 38 formed on the gear 37 clears the corresponding end of the forward shutter curtain tightening hook 35 and becomes ready to engage the hook.

By the time such shutter charge is initiated, the cam 13 has been advanced in phase from the shown position so as to allow the lever 14 to escape out of engagement with the pin 31a and lever 34 and therefore, the lever 34 is then free to permit the forward curtain tightening hook 35 to retain the projection 38 with the aid of spring 35a.

When the setting operations such as shutter charge, film advance and the like effected by the motor 1 comes to a terminal point, i.e. when the pawl 16 has rotated the ratchet wheel 20 to the position 20c in FIG. 1, the engagement between the pawl and the ratchet wheel is released by the fixed pin 26 in the manner as described, to thereby discontinue the operation of the charge mechanism, whereas the motor still continues to revolve and the lever 14 remains in its inoperative position with the pin 14a thereof in engagement with the outer peripheral edge of the cam 13. As the cam is further rotated to the position of FIG. 1, the pin 14a is brought into the cut-away portion 13a of the cam 13 by the force of the spring 33 to permit the lever 14 to actuate the charge pawl 31, release lever 34 and forward curtain tightening hook 35 in succession, thus releasing the shutter. A suitable time lag is provided between the point of time at which the charge mechanism is made inoperative by the disengagement of the pawl 16 with the ratchet wheel 20 as described and the point of time at which the pin 14a of the lever 14 is brought into the cut-away portion 13a of the cam 13, and during such time lag the inertial movement of the film and of the shutter mechanism may all be nullified to permit the shutter to be released in a stable condition.

During the while the camera release button is depressed, the motor continuously rotates to permit recurrence of shutter charge, film advance and shutter release, thus permitting continuous occurrence of picture-taking. When the depression of the release button is discontinued, the release bar 22 moves back in the direction opposite to the direction of arrow to thereby open the release switch SW2, whereas the self-lock switch SW3 parallel thereto remains closed by its engagement with the outer peripheral edge of the cam 15 to permit continued revolution of the motor and at the aforesaid terminal point of the charge operation, the cut-away portion 15a of the cam 15 comes round to confront the self-lock switch SW3 and thus open this switch, whereupon the power supply to the motor is cut off. The motor is stopped by the brake from the brake circuit as described above. On the other hand, as soon as the release bar 22 returns to its upper position, the stop lever 21 is rotated clockwise by the spring 23 to project one end thereof into the circular path of the projections 6a, 6b on the gear 6, and that end of the stop lever may engage one of the projections 6a and 6b as soon as the switch SW3 opens, thus discontinuing the movement of the drive system. At this point of time, the pin 14a of the lever 14 is engaged with the outer peripheral edge of the cam 13 and maintained in a position not for releasing the shutter.

By adjusting the stop mechanism such that the above-described stop motion occurs just prior to the disengagement between the clutch pawl 16 and the ratchet wheel 20, the stop mechanism may effectively operate with respect to the entire drive system and subsequently, depression of the release button may immediately cause the pawl 16 to be disengaged from the ratchet wheel 20 to thereby permit shutter release to take place in a stable condition.

We claim:

1. In a device for continuously driving a camera comprising an electric motor, a charge mechanism for film advance and shutter charge, a shutter release mechanism and a power transmission mechanism, said charge mechanism being intermittently driven through a clutch mechanism and said shutter release mechanism being driven from said electric motor during the inoperative period of said charge mechanism, thereby effecting a sequence of picture-taking operations during the revolutions of said motor, the improvements comprising an adjustable constant voltage circuit provided for energizing said electric motor, whereby the interval between successive shots of the camera is adjusted by adjusting the voltage of said circuit, and further comprising a cam for controlling said release mechanism disposed between said electric motor and said clutch mechanism, said cam being effective to maintain said release mechanism inoperative for a predetermined time after completion of the operation of said charge mechanism.

2. In a device for continuously driving a camera comprising an electric motor, a charge mechanism for film advance and shutter charge, a shutter release mechanism and a power transmission mechanism, said charge mechanism being intermittently driven through a clutch mechanism and said shutter release mechanism being driven from said electric motor during the inoperative period of said charge mechanism, thereby effecting a sequence of picture-taking operations during the revolutions of said motor, the improvement comprising an adjustable constant voltage circuit provided for energizing said electric motor, whereby the interval between successive shots of the camera is adjusted by adjusting the voltage of said circuit, in combination with the further improvement that said charge mechanism includes a film advance sprocket wheel which may be disconnected from said power transmission mechanism in response to opening of the camera's back cover and free to rotate.

3. In a device for continuously driving a camera comprising an electric motor, a charge mechanism for film advance and shutter charge, a shutter release mechanism and a power transmission mechanism, said charge mechanism being intermittently driven through a clutch mechanism and said shutter release mechanism being driven from said electric motor during the inoperative period of said charge mechanism, thereby effecting a sequence of picture-taking operations during the revolutions of said motor, the improvement comprising an adjustable constant voltage circuit provided for energizing said electric motor, whereby the interval between successive shots of the camera is adjusted by adjusting the voltage of said circuit, and the in combination with the further improvement that said clutch mechanism includes a clutch pawl, a ratchet wheel having a plurality of teeth engageable by said pawl, means for causing said clutch pawl to engage said ratchet wheel and means for disengaging said pawl from said ratchet at a predetermined position.

4. A device for continuously driving a camera comprising an electric motor, a charge mechanism for film advance and shutter charge, a shutter release mechanism and a power transmission mechanism, said charge mechanism being intermittently driven through a clutch mechanism and said shutter release mechanism being driven from said electric motor during the inoperative period of said charge mechanism, thereby effecting a sequence of picture-taking operations during the revolutions of said motor; and further comprising means for supplying an adjustable voltage regulated for constancy under load variations to said motor for preventing instability in the interval between successive shots of the camera and for thereby adjusting said interval by adjusting the voltage at which said electric motor is energized, said regulated voltage supply means comprising: a source of reference voltage, means for comparing a fraction of the output voltage with the reference voltage and controlling a semiconductor device to regulate the output voltage by bringing said fraction of the output voltage into a predetermined substantially equal relation to said reference voltage, and means for varying the fraction of the output voltage compared as aforesaid with the reference voltage and thereby adjusting the voltage magnitude at which said output voltage is regulated for constancy.

5. A device according to claim 4 further comprising an electrical circuit for braking and mechanical stop means, said mechanical stop means being associated with a shutter button of the camera, and being inoperative during the depression of the shutter button, but operative, when the button is released, to stop the device at a predetermined position.

6. A device according to claim 5, wherein said predetermined position corresponds to a position in which the shutter is charged up.

7. A device for continuously driving a camera comprising an electric motor, a charge mechanism for film advance and shutter charge, a shutter release mechanism and a power transmission mechanism, said charge mechanism being intermittently driven through a clutch mechanism and said shutter release mechanism being driven from said electric motor during the inoperative period of said charge mechanism, thereby effecting a sequence of picture-taking operations during the revolutions of said motor, and further comprising a cam for controlling said release mechanism disposed between said electric motor and said clutch mechanism, said cam being effecting to maintain said release mechanism inoperative for a predetermined time after completion of the operation of said charge mechanism.

8. A device for continuously driving a camera comprising an electric motor, a charge mechanism for film advance and shutter charge, a shutter release mechanism and a power transmission mechanism, said charge mechanism being intermittently driven through a clutch mechanism and said shutter release mechanism being driven from said electric motor during the inoperative period of said charge mechanism, thereby effecting a sequence of picture-taking operations during the revolutions of said motor, said charge mechanism including a film advance sprocket wheel which may be disconnected from said power transmission mechanism in response to opening of the camera's back cover and free to rotate.

9. A device for continuously driving a camera comprising an electric motor, a charge mechanism for film advance and shutter charge, a shutter release mechanism and a power transmission mechanism, said charge mechanism being intermittently driven through a clutch mechanism and said shutter release mechanism being driven from said electric motor during the inoperative period of said charge mechanism, thereby effecting a sequence of picture-taking operations during the revolutions of said motor, said clutch mechanism including a clutch pawl, a ratchet wheel having a plurality of teeth engageable by said pawl, means for causing said clutch pawl to engage said ratchet wheel, and means for disengaging said pawl from said ratchet wheel at a predetermined position.

* * * * *